US011852720B2

(12) United States Patent
Hess et al.

(10) Patent No.: US 11,852,720 B2
(45) Date of Patent: Dec. 26, 2023

(54) VEHICLE RADAR SYSTEM WITH ENHANCED WAVE GUIDE ANTENNA SYSTEM

(71) Applicant: Magna Electronics Inc., Auburn Hills, MI (US)

(72) Inventors: Holger Hess, Hösbach (DE); Wilhelm Johann Wolfgang Wöhlte, Berlin (DE)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

(21) Appl. No.: 17/935,191

(22) Filed: Sep. 26, 2022

(65) Prior Publication Data

US 2023/0020243 A1 Jan. 19, 2023

Related U.S. Application Data

(63) Continuation of application No. 16/697,230, filed on Nov. 27, 2019, now Pat. No. 11,454,720.

(60) Provisional application No. 62/772,274, filed on Nov. 28, 2018.

(51) Int. Cl.
   *G01S 13/931* (2020.01)
   *H01Q 1/32* (2006.01)
   *H01Q 21/06* (2006.01)
   *G01S 7/03* (2006.01)
   *G01S 7/02* (2006.01)

(52) U.S. Cl.
   CPC .......... *G01S 13/931* (2013.01); *G01S 7/032* (2013.01); *H01Q 1/3233* (2013.01); *H01Q 21/065* (2013.01); *G01S 7/027* (2021.05); *G01S 2013/93271* (2020.01)

(58) Field of Classification Search
   CPC ................ G01S 13/931; G01S 7/032; G01S 2013/93271; G01S 7/027; H01Q 1/3233; H01Q 21/065
   See application file for complete search history.

(56) References Cited

U.S. PATENT DOCUMENTS

| | | |
|---|---|---|
| 5,949,331 A | 9/1999 | Schofield et al. |
| 6,587,186 B2 | 7/2003 | Bamji et al. |
| 6,674,895 B2 | 1/2004 | Rafii et al. |
| 6,678,039 B2 | 1/2004 | Charbon |

(Continued)

FOREIGN PATENT DOCUMENTS

| | | |
|---|---|---|
| WO | 2011090484 A1 | 7/2011 |
| WO | 2018007995 A1 | 1/2018 |

*Primary Examiner* — Peter M Bythrow
*Assistant Examiner* — Nazra Nur Waheed
(74) *Attorney, Agent, or Firm* — HONIGMAN LLP

(57) ABSTRACT

A vehicular radar sensing system includes a radar sensor disposed at a vehicle so as to sense exterior of the vehicle and having at least one transmitter that transmits radio signals and at least one receiver that receives radio signals. The radar sensor includes a transmitting wave guide antenna and a receiving wave guide antenna, a PCB, and a processor operable to process radio signals transmitted by the at least one transmitter and received by the at least one receiver. Each of the wave guide elements includes a respective wave guide slot disposed at the inboard side of the PCB, and another respective wave guide slot that guides the radio signals to or from the environment, and a respective air wave guide that guides the radio signals between the respective wave guide slots.

24 Claims, 5 Drawing Sheets

(56) References Cited

U.S. PATENT DOCUMENTS

| | | |
|---|---|---|
| 6,690,268 B2 | 2/2004 | Schofield et al. |
| 6,690,354 B2 | 2/2004 | Sze |
| 6,693,517 B2 | 2/2004 | McCarthy et al. |
| 6,710,770 B2 | 3/2004 | Tomasi et al. |
| 6,825,455 B1 | 11/2004 | Schwarte |
| 6,876,775 B2 | 4/2005 | Torunoglu |
| 6,906,793 B2 | 6/2005 | Bamji et al. |
| 6,919,549 B2 | 7/2005 | Bamji et al. |
| 7,053,357 B2 | 5/2006 | Schwarte |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,580,795 B2 | 8/2009 | McCarthy et al. |
| 7,990,711 B1 | 8/2011 | Andry et al. |
| 8,013,780 B2 | 9/2011 | Lynam |
| 8,027,029 B2 | 9/2011 | Lu et al. |
| 8,698,894 B2 | 4/2014 | Briggance |
| 9,036,026 B2 | 5/2015 | Dellantoni et al. |
| 9,146,898 B2 | 9/2015 | Ihlenburg et al. |
| 9,575,160 B1 | 2/2017 | Davis et al. |
| 9,599,702 B1 | 3/2017 | Bordes et al. |
| 9,689,967 B1 | 6/2017 | Stark et al. |
| 9,753,121 B1 | 9/2017 | Davis et al. |
| 11,454,720 B2 | 9/2022 | Hess et al. |
| 2010/0001897 A1 | 1/2010 | Lyman |
| 2010/0245066 A1 | 9/2010 | Sarioglu et al. |
| 2012/0062743 A1 | 3/2012 | Lynam et al. |
| 2012/0218412 A1 | 8/2012 | Dellantoni et al. |
| 2013/0181864 A1 | 7/2013 | Kim et al. |
| 2013/0215271 A1 | 8/2013 | Lu |
| 2013/0222592 A1 | 8/2013 | Gieseke |
| 2013/0321627 A1* | 12/2013 | Turn, Jr. ............... B60W 30/00 348/148 |
| 2014/0218529 A1 | 8/2014 | Mahmoud et al. |
| 2014/0375476 A1 | 12/2014 | Johnson et al. |
| 2015/0124096 A1 | 5/2015 | Koravadi |
| 2015/0158499 A1 | 6/2015 | Koravadi |
| 2015/0251599 A1 | 9/2015 | Koravadi |
| 2015/0352953 A1 | 12/2015 | Koravadi |
| 2015/0364830 A1 | 12/2015 | Tong et al. |
| 2016/0036917 A1 | 2/2016 | Koravadi et al. |
| 2016/0210853 A1 | 7/2016 | Koravadi |
| 2017/0129489 A1 | 5/2017 | Pawlicki et al. |
| 2017/0222311 A1 | 8/2017 | Hess et al. |
| 2017/0254873 A1 | 9/2017 | Koravadi |
| 2017/0276788 A1 | 9/2017 | Wodrich |
| 2017/0315231 A1 | 11/2017 | Wodrich |
| 2017/0356994 A1 | 12/2017 | Wodrich et al. |
| 2018/0015875 A1 | 1/2018 | May et al. |
| 2018/0045812 A1 | 2/2018 | Hess |
| 2018/0065623 A1 | 3/2018 | Wodrich et al. |
| 2018/0067194 A1 | 3/2018 | Wodrich et al. |
| 2018/0105176 A1 | 4/2018 | Pawlicki et al. |
| 2018/0231635 A1 | 8/2018 | Woehlte |
| 2018/0231657 A1 | 8/2018 | Woehlte |
| 2018/0299533 A1 | 10/2018 | Pliefke et al. |
| 2019/0011532 A1* | 1/2019 | Loesch ............... G01S 13/42 |
| 2019/0061760 A1 | 2/2019 | Pawlicki et al. |
| 2019/0072666 A1 | 3/2019 | Duque Biarge et al. |
| 2019/0072667 A1 | 3/2019 | Duque Biarge et al. |
| 2019/0072668 A1 | 3/2019 | Duque Biarge et al. |
| 2019/0072669 A1 | 3/2019 | Duque Biarge et al. |
| 2019/0124238 A1 | 4/2019 | Byrne et al. |
| 2019/0124243 A1 | 4/2019 | Mleczko et al. |
| 2019/0217775 A1 | 7/2019 | May et al. |
| 2019/0306966 A1 | 10/2019 | Byrne et al. |
| 2020/0136225 A1* | 4/2020 | Shi ............... H01P 5/08 |

\* cited by examiner

VEHICLE RADAR SYSTEM WITH ENHANCED WAVE GUIDE ANTENNA SYSTEM

CROSS REFERENCE TO RELATED APPLICATIONS

The present application is a continuation of U.S. patent application Ser. No. 16/697,230, filed Nov. 27, 2019, now U.S. Pat. No. 11,454,720, which claims the filing benefits of U.S. provisional application Ser. No. 62/772,274, filed Nov. 28, 2018, which is hereby incorporated herein by reference in its entirety.

FIELD OF THE INVENTION

The present invention relates generally to a vehicle sensing system for a vehicle and, more particularly, to a vehicle sensing system that utilizes one or more radar sensors at a vehicle.

BACKGROUND OF THE INVENTION

It is known to provide a radar sensor or a plurality of radar sensors at a vehicle. Examples of vehicular radar sensing systems are described in U.S. Pat. Nos. 8,027,029; 8,013,780 and/or 7,053,357, which are hereby incorporated herein by reference in their entireties.

SUMMARY OF THE INVENTION

The present invention provides a driving assistance system or sensing system or vehicle control system for a vehicle that utilizes one or more radar sensors to sense regions exterior of the vehicle, with a radar sensor that transmits and receives signals, and with the received signals processed to detect the presence of objects at or near the vehicle in the field of sensing of the sensor. The radar sensor includes a printed circuit board (PCB) with a processor disposed at an inboard side of the PCB. The processor is operable to process received and transmitted radio signals. The radar sensor also includes a wave guide antenna and the wave guide antenna includes a first wave guide slot, a second wave guide slot, and an air wave guide. The first wave guide slot is disposed at an inboard side of the PCB and guides the radio signals to and from the receivers and/or transmitters. The second wave guide slot guides the radio signal to and from the environment. The air wave guide guides the radio signals between the first wave guide slot and the second wave guide slot.

These and other objects, advantages, purposes and features of the present invention will become apparent upon review of the following specification in conjunction with the drawings.

DESCRIPTION OF THE PREFERRED EMBODIMENTS

A vehicle sensing system and/or driver assist system and/or driving assist system and/or object detection system and/or alert system operates to capture sensing data exterior of the vehicle and may process the captured data to detect objects at or near the vehicle and in the predicted path of the vehicle, such as to assist a driver of the vehicle or a control for an autonomous vehicle in maneuvering the vehicle in a forward or rearward direction. The system includes a processor that is operable to receive sensing data from one or more sensors and provide an output, such as an alert or control of a vehicle system.

Figure 1:
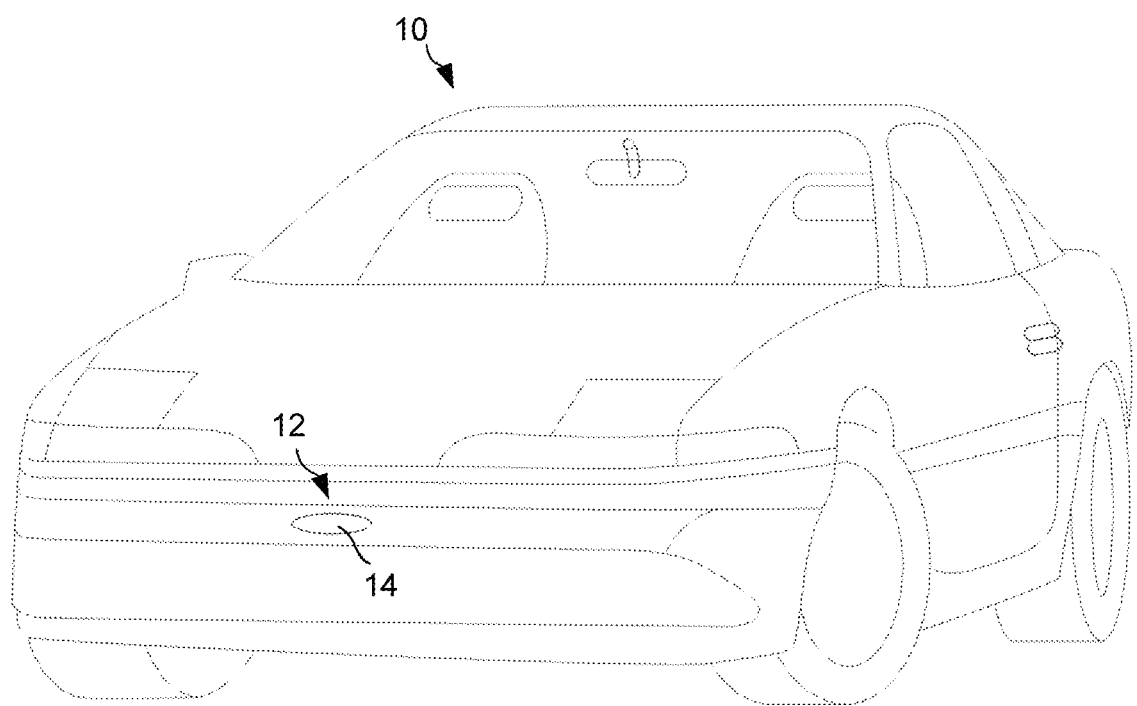
FIG. 1 is a perspective view of a vehicle with a sensing system that incorporates a radar sensor in accordance with the present invention.

Referring now to the drawings and the illustrative embodiments depicted therein, a vehicle 10 (FIG. 1) includes an driving assistance system or sensing system 12 that includes at least one radar sensor unit, such as a forward facing radar sensor unit 14 (and the system may optionally include multiple exterior facing sensors, such as cameras or other sensors, such as a rearward facing sensor at the rear of the vehicle, and a sideward/rearward facing sensor at respective sides of the vehicle), which sense regions exterior of the vehicle. The sensing system 12 includes a control or electronic control unit (ECU) or processor that is operable to process data captured by the sensor or sensors and may detect objects or the like. The data transfer or signal communication from the sensor to the ECU may comprise any suitable data or communication link, such as a vehicle network bus or the like of the equipped vehicle.

The radar sensor or sensors of the driving assist system may be used in conjunction with a plurality of image sensors mounted at the equipped vehicle and/or with at least one lidar sensor also mounted (along with the image sensors and the radar sensor) at the equipped vehicle. Image data and radar data and lidar data are provided to a central electronic control unit (ECU) or module for processing thereat. The ECU includes at least one processor that processes the captured/sensed data, whereby one or more functions or systems (such as a braking system and/or steering system and/or the like) of the vehicle is controlled responsive to processing of the captured/sensed data.

Figure 2:
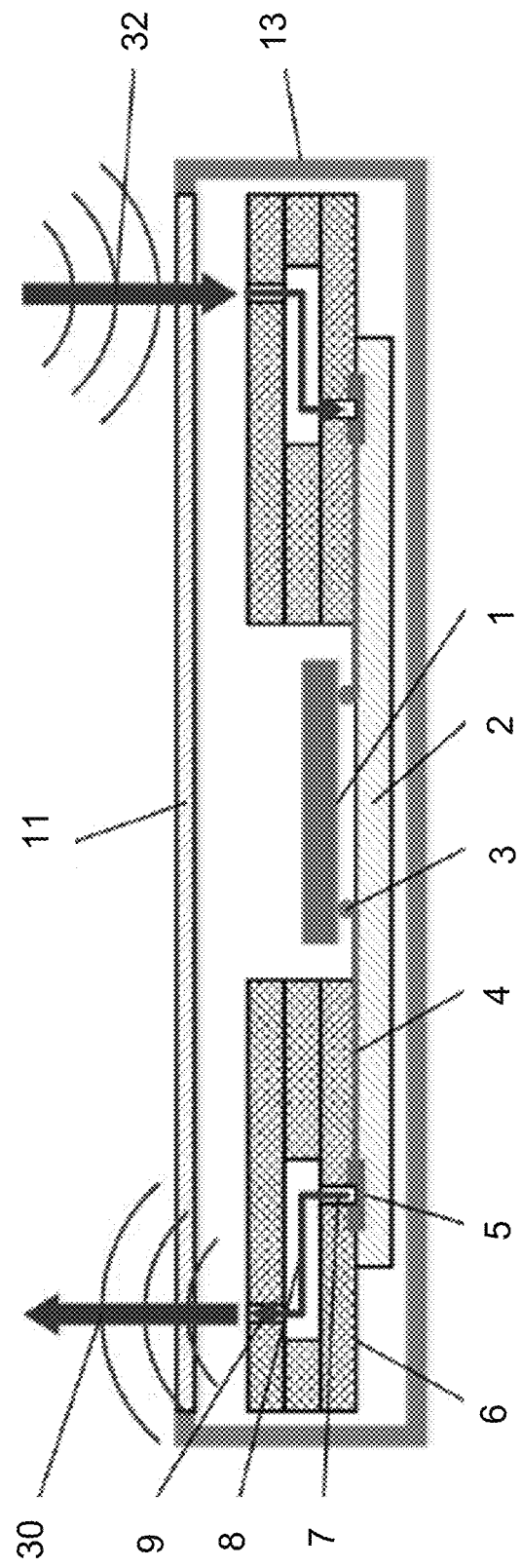
FIG. 2 is a cross-section of a known radar sensor with wave guide antennas and a processor disposed at an outboard side of a printed circuit board.
Figure 3:
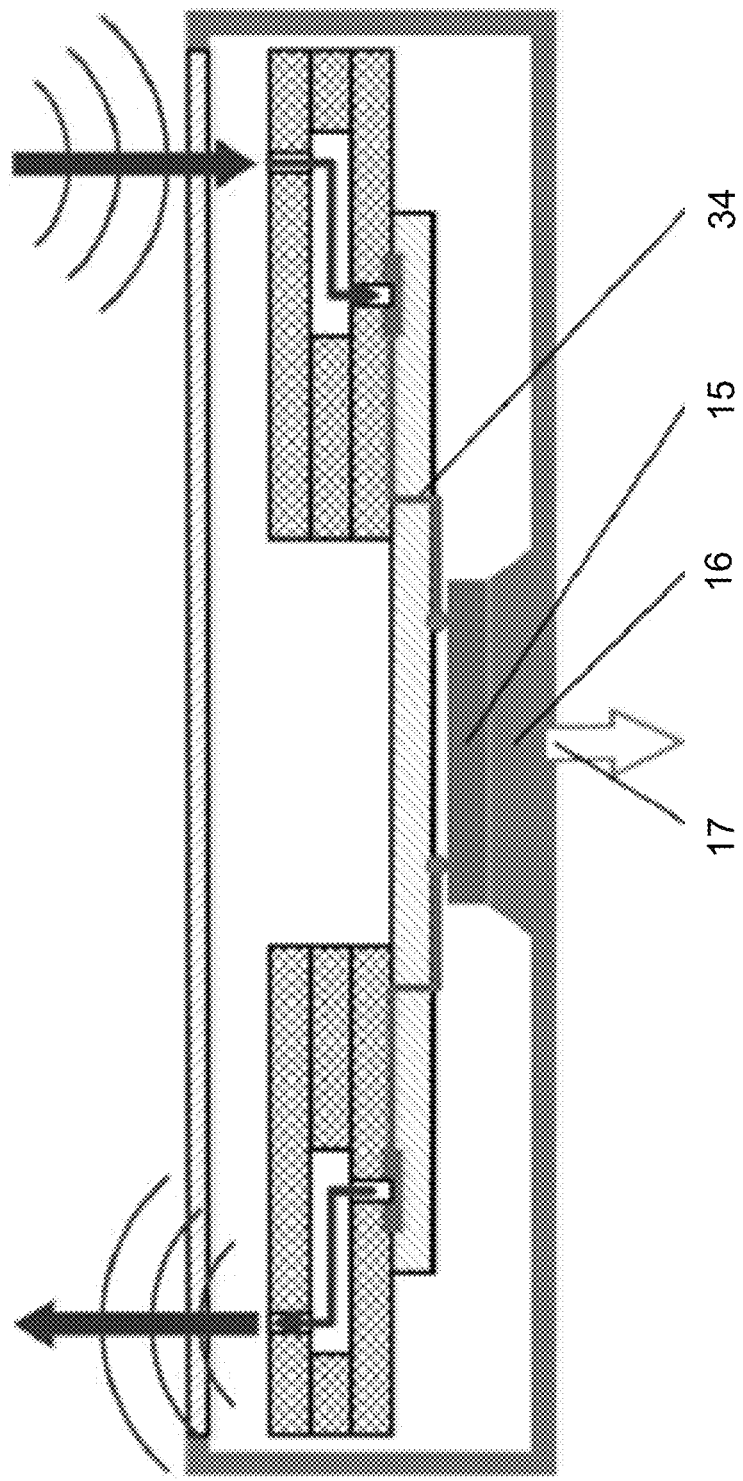
FIG. 3 is a cross-section of a known radar sensor with wave guide antennas and a processor disposed at an inboard side of a printed circuit board.

Air wave guide antennas are commonly used in radar applications. As shown in FIG. 2, these radar sensors include a printed circuit board (PCB) 2 with one or more air wave guide antennas 6 mounted onto the PCB 2. The air wave guide antenna 6 is a three-dimensional (3D) structure that may contain various configurations of wave guide elements 7, 8, 9 to form different structures. The radar sensors typically include an antenna cover 11 and/or housing 13. The air wave guide antenna 6 passes radio frequency (RF) signals to and from an RF chip 1 and one or more transmitters/receivers. The RF chip 1 may be disposed on the PCB 2. Typically, either the wave guide antenna 6 and the RF chip 1 are placed on the PCB's top side or outboard side (i.e., the side facing away from the vehicle and towards the environment) (FIG. 2) or the antenna 6 is on the top of the PCB 2 and the RF chip 1 is placed on the bottom or inboard side of the PCB 2 (i.e., the side facing towards the vehicle and away from the environment) (FIG. 3). The same RF chip 1 may control both transmissions and receptions or two separate RF chips may be included on the PCB 2.

The air wave guide antennas 6 typically include wave guide slots 7 that face the ambient environment or horn antenna structures or similar structures for radiating to the outside world. The antennas 6 may be constructed of electrically conductive material (e.g., a metal). The antennas are often cheaply produced via metallized injection molded plastic. Still referring to FIG. 2, RF signals 30 transmitted from the RF chip 1 pass through solder connections 3 and through PCB wiring 4 without crossing to the other side of the PCB 2. The signals pass through the wave guide transition structure 5 and into the air wave guide antenna elements (e.g., air wave guide slot 7, air wave guide 8, and air wave guide slot 9). The transmitted RF signals 30 pass through the wave guide slots 9 and into the environment. When receiving reflected RF signals 32, the reflected RF signals 32 arrive through the air wave guide slots 9 and other elements 7, 8. The reflected signals 32 then pass through the wave guide transition structure 5, through the PCB wiring 4 and solder connections 3 and to the same or different RF chip 1.

Referring now to FIG. 3, when the RF chip 15 is placed on the bottom of the PCB (or the opposite side of the wave guide antenna), the transmitted RF signals must travel through the solder connection, PCB wiring (by crossing through the PCB at transition 34, which incurs RF signal loss), the wave guide transition structure, and into the air wave guide antenna elements and wave guide slots. When receiving RF signals, the signals must take the same path back (including through the PCB transition 34). The RF chip may be mounted to a heatsink 16 which may transfer heat to the ambient environment 17.

Thus, FIG. 2 illustrates an air wave guide antenna system that does not incur additional signal loss by passing the RF signals through the PCB, but does not provide an opportunity to cool the RF chip by attaching a heat sink to, for example, a metal-backed housing. FIG. 3 illustrates an air wave guide antenna system that incurs additional signal loss by passing the RF signals through the PCB, but also provides the opportunity to cool the RF chip by attaching a heat sink to the RF chip and using a metallic housing to conduct heat away from the heat sink by placing a thermal material (e.g., thermal grease or thermal pad) between the heatsink and the housing to ensure best heat transfer and to compensate for any tolerances. Therefore, in the current art, a designer must face the tradeoff of additional signal loss or more difficult thermal management.

Figure 4:
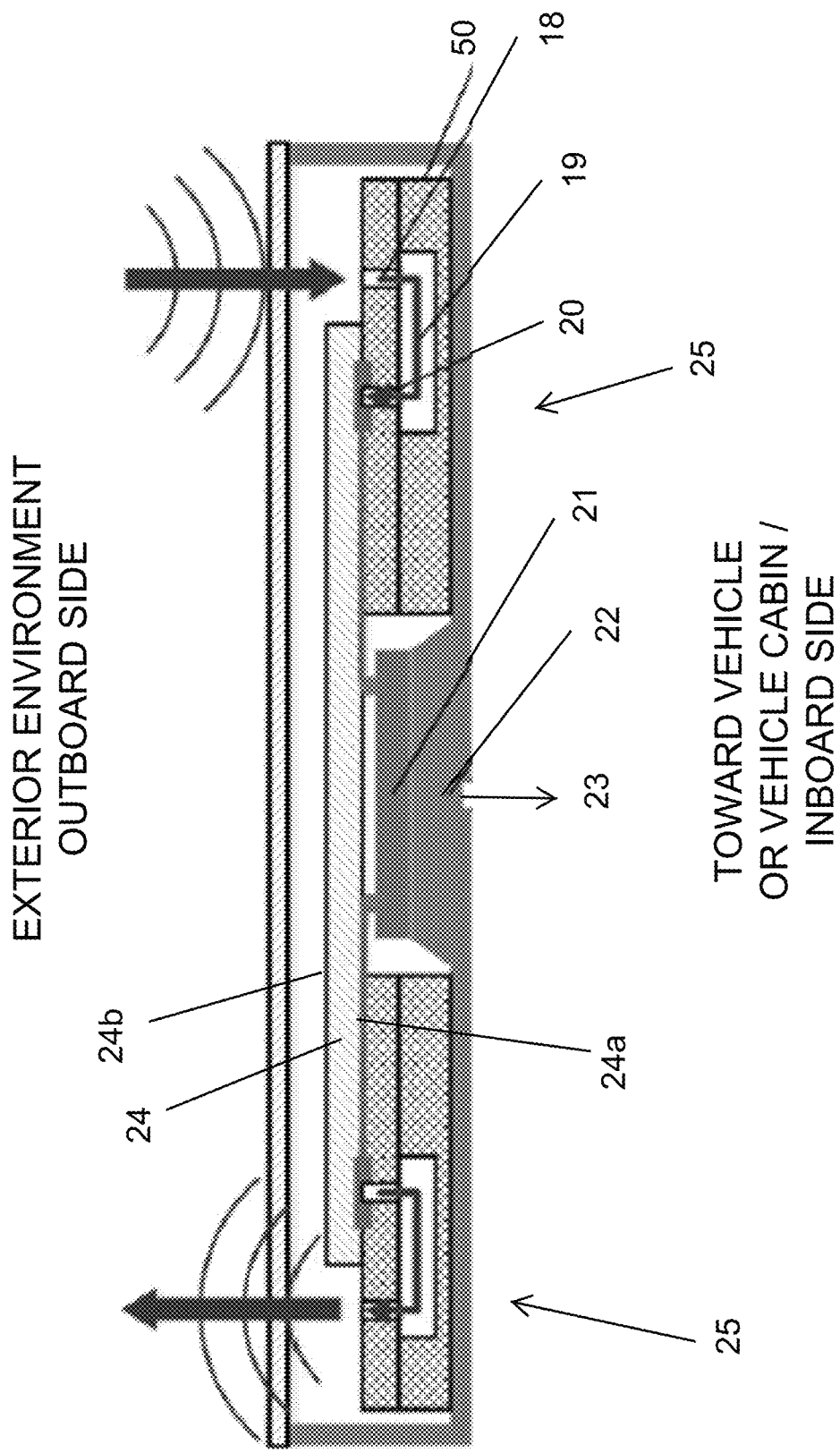
FIG. 4 is a cross-section of a radar sensor with wave guide antennas and a processor disposed at an inboard side of a printed circuit board in accordance with the present invention.

The present invention provides an air wave guide antenna system or radar sensor that does not require this tradeoff. As shown in FIG. 4, a radar sensor includes an RF chip or processor 21 disposed on the bottom of a PCB 24. The air wave guide antenna(s) 25 are also placed on the bottom or inboard side 24a of the PCB 24 that faces inboard of the vehicle or towards the interior cabin of the vehicle (opposite the top or outboard side 24b that faces outboard or away from the vehicle and toward the exterior environment), and thus on the same side as the RF chip 21. Because of this, the radio signals do not suffer the signal loss associated with passing through the PCB while also allowing the RF chip 21 to be cooled via heat sink 22 that is mounted to or attached at the housing and allows heat transfer to the ambient environment 23. To accomplish this, the PCB wave guide slots 20 are placed on the same side as the ambient air wave guide slots 18 and the antenna elements extend beyond the edge of the PCB. In addition to allowing the RF signals to travel along the surface of the PCB, the number of wave guide elements may also be reduced.

In some implementations, the radar sensor includes a PCB 24. The PCB 24 has an inboard side that faces toward the vehicle and an outboard side that faces away from the vehicle. The PCB 24 includes a processor or RF chip 21 and at least one receiver and at least one transmitter on the inboard side of the PCB. The radar sensor also includes at least one air wave guide antenna 25 (which may include a plurality of wave guide elements 50). The air wave guide antenna is at least partially disposed at the inboard side of the PCB 24 and provides slots or passageways to guide the transmitted radio signals from the transmitter to the environment and to guide the received radio signals from the environment to the receiver.

In some examples, the wave guide antenna includes a first wave guide slot 20, a second wave guide slot 18, and an air wave guide 19. The first wave guide slot 20 is established at the wave guide antenna so as to be disposed at the inboard side of the PCB and guides the transmitted radio signals from the transmitter to the air wave guide and/or guides the received radio signals form the air wave guide to the receiver. The second wave guide slot 18 is established at the wave guide antenna and guides the transmitted radio signals from the air wave guide to the environment and guides the received radio signals from the environment to the air wave guide.

Thus, the present invention allows for direct PCB to wave guide antenna connections without additional losses by crossing the PCB while maintaining heat transfer to ambient through the metal-backed housing.

Figure 5A:
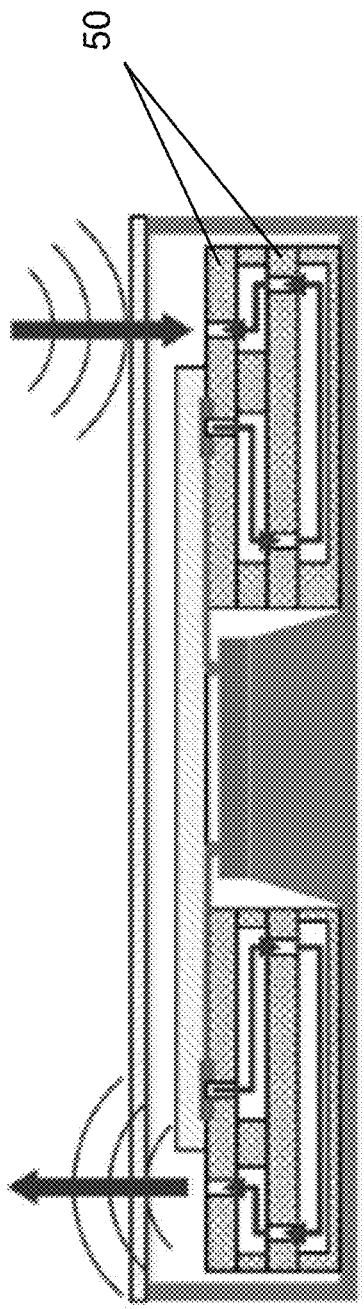
FIGS. 5A and 5B are cross-sections of the radar sensor of FIG. 4 with alternative configurations of wave guide elements.
Figure 5B:
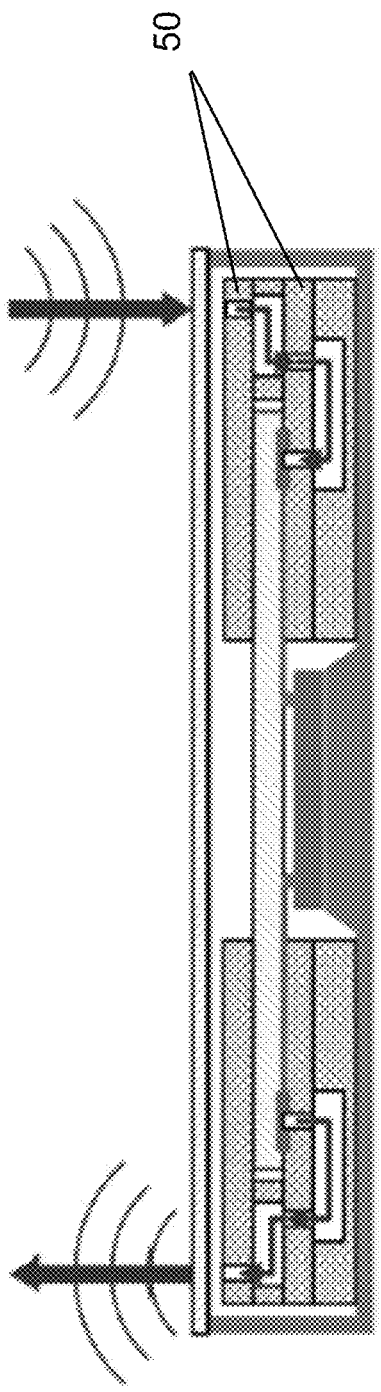

Optionally, and such as illustrated in FIGS. 5A and 5B, a variety of 3D structures for the air wave guide antenna may be used. For example, when different RF channels need to cross each other, more air wave guide elements 50 may be stacked (FIG. 5A). Further, with additional air wave guide elements 50, the PCB may be placed in between the different air wave guide elements (FIG. 5B).

Thus, the present invention provides a radar sensor with a processor disposed at an inboard side of a PCB. The radar sensor also includes a wave guide antenna that includes a plurality of wave guide slots. A first wave guide slot is disposed at the inboard side of the PCB and guides radio signals to and from transmitters and/or receivers disposed at the PCB. A second wave guide slot guides the radio signals to and from the environment. Optionally, the second wave guide slot guides the radio signals in an outboard direction. An air wave guide guides the radio signals between the first wave guide slot and the second wave guide slot. The radio signals travel along the surface of the PCB (as opposed to crossing through it) to and from the first wave guide slot, thus minimizing signal loss. Optionally, a heat sink is attached to the processor. The heat sink may be fixed to a metal housing of the radar sensor and transfer heat away from the processor and into the metal housing.

The heat sink may utilize aspects of the systems and assemblies described in U.S. Publication Nos. US-2019-0306966; US-2019-0124243 and/or US-2019-0124238, and/or U.S. patent application Ser. No. 16/662,205, filed Oct. 24, 2019, published Apr. 30, 2020 as U.S. Publication No. US-2020-0137926, Ser. No. 16/525,666, filed Jul. 30, 2019, now U.S. Pat. No. 11,397,306, and/or Ser. No. 16/451,179, filed Jun. 25, 2019, now U.S. Pat. No. 10,899,275, which are all hereby incorporated herein by reference in their entireties.

The sensing system may utilize aspects of the systems described in U.S. Pat. Nos. 9,753,121; 9,689,967; 9,599, 702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular radar sensing system, the vehicular radar sensing system comprising:
    a radar sensor disposed at a vehicle, the radar sensor sensing exterior of the vehicle;
    wherein the radar sensor comprises (i) at least one transmitter that transmits radio signals and (ii) at least one receiver that receive radio signals, and wherein received radio signals received by the at least one receiver are transmitted radio signals that are reflected from an object present in a field of sensing of the radar sensor;
    a processor operable to process radio signals transmitted by the at least one transmitter and received by the at least one receiver;
    wherein the radar sensor comprises a printed circuit board (PCB) with an inboard side facing toward an interior of the vehicle and an outboard side facing toward an environment exterior of the vehicle, and wherein the at least one transmitter and the at least one receiver are disposed at the inboard side of the PCB;
    wherein the radar sensor comprises a transmitting wave guide element and a receiving wave guide element;
    wherein the transmitting wave guide element guides transmitted radio signals from the at least one transmitter to the exterior environment, and wherein the transmitting wave guide element comprises at least (i) a first transmitting wave guide slot, (ii) a second transmitting wave guide slot, and (iii) a transmitting air wave guide;
    wherein the first transmitting wave guide slot is disposed at the inboard side of the PCB and guides the transmitted radio signals from the at least one transmitter to the transmitting air wave guide, and wherein the transmitting air wave guide extends beyond the outer periphery of the PCB;
    wherein the transmitting air wave guide guides transmitted radio signals from the first transmitting wave guide slot to the second transmitting wave guide slot;
    wherein the second transmitting wave guide slot guides transmitted radio signals from the transmitting air wave guide to the environment exterior the vehicle;
    wherein the receiving wave guide element guides reflected radio signals from the exterior environment to the at least one receiver, and wherein the receiving wave guide element comprises at least (i) a first receiving wave guide slot, (ii) a second receiving wave guide slot, and (iii) a receiving air wave guide;
    wherein the second receiving wave guide slot guides reflected radio signals from the environment exterior the vehicle to the receiving air wave guide, and wherein the receiving air wave guide extends beyond the outer periphery of the PCB;
    wherein the receiving air wave guide guides reflected radio signals from the second receiving wave guide slot to the first receiving wave guide slot; and
    wherein the first receiving wave guide slot is disposed at the inboard side of the PCB and guides the reflected radio signals from the receiving air wave guide to the at least one receiver.

2. The vehicular radar sensing system of claim 1, wherein the radar sensor comprises a plurality of wave guide elements that are stacked to form the transmitting wave guide element.

3. The vehicular radar sensing system of claim 1, wherein the radar sensor comprises a plurality of wave guide elements that are stacked to form the receiving wave guide element.

4. The vehicular radar sensing system of claim 1, wherein the second transmitting wave guide slot is located outboard of the PCB facing toward the environment exterior of the vehicle.

5. The vehicular radar sensing system of claim 1, wherein the second receiving wave guide slot is located outboard of the PCB facing toward the environment exterior of the vehicle.

6. The vehicular radar sensing system of claim 1, wherein the processor is disposed at the inboard side of the PCB.

7. The vehicular radar sensing system of claim 1, wherein the second transmitting wave guide slot is disposed beyond the outer periphery of the PCB.

8. The vehicular radar sensing system of claim 1, wherein the second receiving wave guide slot is disposed beyond the outer periphery of the PCB.

9. The vehicular radar sensing system of claim 1, comprising a heatsink thermally conductively connected with the processor.

10. The vehicular radar sensing system of claim 9, wherein the heatsink is attached to a housing of the radar sensor.

11. The vehicular radar sensing system of claim 10, wherein the heatsink conducts heat away from the processor and into the housing.

12. The vehicular radar sensing system of claim 9, wherein the processor is disposed at the inboard side of the PCB.

13. The vehicular radar sensing system of claim 1, comprising an electronic control unit, wherein the electronic control unit comprises the processor.

14. A vehicular radar sensing system, the vehicular radar sensing system comprising:
    a radar sensor disposed at a vehicle, the radar sensor sensing exterior of the vehicle;
    wherein the radar sensor comprises (i) at least one transmitter that transmits radio signals and (ii) at least one receiver that receive radio signals, and wherein received radio signals received by the at least one receiver are transmitted radio signals that are reflected from an object present in a field of sensing of the radar sensor;
    a processor operable to process radio signals transmitted by the at least one transmitter and received by the at least one receiver;
    wherein the radar sensor comprises a printed circuit board (PCB) with an inboard side facing toward an interior of the vehicle and an outboard side facing toward an environment exterior of the vehicle, and wherein the at least one transmitter and the at least one receiver are disposed at the inboard side of the PCB;

wherein the radar sensor comprises a transmitting wave guide element and a receiving wave guide element;

wherein the transmitting wave guide element comprises at least (i) a first transmitting wave guide slot, (ii) a second transmitting wave guide slot, and (iii) a transmitting air wave guide;

wherein the first transmitting wave guide slot is disposed at the inboard side of the PCB and guides the transmitted radio signals from the at least one transmitter to the transmitting air wave guide, and wherein the transmitting air wave guide is spaced from the inboard side of the PCB by the first transmitting wave guide slot and extends beyond the outer periphery of the PCB;

wherein the transmitting air wave guide guides transmitted radio signals from the first transmitting wave guide slot to the second transmitting wave guide slot;

wherein the second transmitting wave guide slot is located outboard of the PCB facing toward the environment exterior of the vehicle;

wherein the second transmitting wave guide slot guides transmitted radio signals from the transmitting air wave guide to the environment exterior the vehicle;

wherein the receiving wave guide element comprises at least (i) a first receiving wave guide slot, (ii) a second receiving wave guide slot, and (iii) a receiving air wave guide;

wherein the second receiving wave guide slot is located outboard of the PCB facing toward the environment exterior of the vehicle;

wherein the second receiving wave guide slot guides reflected radio signals from the environment exterior the vehicle to the receiving air wave guide, and wherein the receiving air wave guide is spaced from the inboard side of the PCB by the first receiving wave guide slot and extends beyond the outer periphery of the PCB;

wherein the receiving air wave guide guides reflected radio signals from the second receiving wave guide slot to the first receiving wave guide slot; and wherein the first receiving wave guide slot is disposed at the inboard side of the PCB and guides the reflected radio signals from the receiving air wave guide to the at least one receiver.

15. The vehicular radar sensing system of claim 14, wherein the radar sensor comprises a plurality of wave guide elements that are stacked to form the transmitting wave guide element.

16. The vehicular radar sensing system of claim 14, wherein the radar sensor comprises a plurality of wave guide elements that are stacked to form the receiving wave guide element.

17. The vehicular radar sensing system of claim 14, wherein the processor is disposed at the inboard side of the PCB.

18. The vehicular radar sensing system of claim 14, comprising a heatsink thermally conductively connected with the processor.

19. The vehicular radar sensing system of claim 18, wherein the heatsink is attached to a housing of the radar sensor, and wherein the heatsink conducts heat away from the processor and into the housing.

20. A vehicular radar sensing system, the vehicular radar sensing system comprising:

a radar sensor disposed at a vehicle, the radar sensor sensing exterior of the vehicle;

wherein the radar sensor comprises (i) at least one transmitter that transmits radio signals and (ii) at least one receiver that receive radio signals, and wherein received radio signals received by the at least one receiver are transmitted radio signals that are reflected from an object present in a field of sensing of the radar sensor;

a processor operable to process radio signals transmitted by the at least one transmitter and received by the at least one receiver;

wherein the radar sensor comprises a printed circuit board (PCB) with an inboard side facing toward an interior of the vehicle and an outboard side facing toward an environment exterior of the vehicle, and wherein the at least one transmitter and the at least one receiver are disposed at the inboard side of the PCB;

wherein the processor is disposed at the inboard side of the PCB;

wherein the radar sensor comprises a transmitting wave guide element and a receiving wave guide element;

wherein the transmitting wave guide element comprises a plurality of stacked wave guide elements, and wherein the receiving wave guide element comprises a plurality of stacked wave guide elements;

wherein the transmitting wave guide element guides transmitted radio signals from the at least one transmitter to the exterior environment, and wherein the transmitting wave guide element comprises at least (i) a first transmitting wave guide slot, (ii) a second transmitting wave guide slot, and (iii) a transmitting air wave guide;

wherein the first transmitting wave guide slot is disposed at the inboard side of the PCB and guides the transmitted radio signals from the at least one transmitter to the transmitting air wave guide, and wherein the transmitting air wave guide extends beyond the outer periphery of the PCB;

wherein the transmitting air wave guide guides transmitted radio signals from the first transmitting wave guide slot to the second transmitting wave guide slot;

wherein the second transmitting wave guide slot guides transmitted radio signals from the transmitting air wave guide to the environment exterior the vehicle;

wherein the receiving wave guide element guides reflected radio signals from the exterior environment to the at least one receiver, and wherein the receiving wave guide element comprises at least (i) a first receiving wave guide slot, (ii) a second receiving wave guide slot, and (iii) a receiving air wave guide;

wherein the second receiving wave guide slot guides reflected radio signals from the environment exterior the vehicle to the receiving air wave guide, and wherein the receiving air wave guide extends beyond the outer periphery of the PCB;

wherein the receiving air wave guide guides reflected radio signals from the second receiving wave guide slot to the first receiving wave guide slot; and wherein the first receiving wave guide slot is disposed at the inboard side of the PCB and guides the reflected radio signals from the receiving air wave guide to the at least one receiver.

21. The vehicular radar sensing system of claim 20, wherein the second transmitting wave guide slot is located outboard of the PCB facing towards the environment exterior of the vehicle.

22. The vehicular radar sensing system of claim 20, wherein the second receiving wave guide slot is located outboard of the PCB facing towards the environment exterior of the vehicle.

23. The vehicular radar sensing system of claim 20, comprising a heatsink thermally conductively connected with the processor.

24. The vehicular radar sensing system of claim 23, wherein the heatsink is attached to a housing of the radar sensor, and wherein the heatsink conducts heat away from the processor and into the housing.

\* \* \* \* \*